United States Patent [19]

Copeland

[11] 4,271,536
[45] Jun. 2, 1981

[54] DISCRIMINATOR THRESHOLD LEVEL CONTROL CIRCUIT FOR A DIGITAL TRANSMISSION SYSTEM

[75] Inventor: John A. Copeland, Fair Haven, N.J.

[73] Assignee: Bell Telephone Laboratories, Incorporated, Murray Hill, N.J.

[21] Appl. No.: 956,059

[22] Filed: Oct. 30, 1978

[51] Int. Cl.³ .............................................. H04B 9/00
[52] U.S. Cl. .................................... 455/619; 307/359
[58] Field of Search ........................... 250/199, 211 J; 307/311, 248, 239, 358, 359; 179/15 BP, 15 BL; 375/4, 41, 58, 76; 371/6; 329/104; 360/42; 455/619

[56] References Cited

U.S. PATENT DOCUMENTS

| | | | |
|---|---|---|---|
| 3,535,529 | 10/1970 | Davidson | 307/311 |
| 3,584,962 | 6/1971 | Irwin et al. | 250/211 J |
| 4,015,118 | 3/1977 | Andersson et al. | 250/211 J |
| 4,051,473 | 9/1977 | Hooker, Jr. | 307/359 |
| 4,070,572 | 1/1978 | Summerhayes | 250/199 |

OTHER PUBLICATIONS

Dorratz et al.-Constant False Alarm Rate Bias Control for an Avalanche Photodiode Laser Rec.-Rev. of Scien. Instr.-vol. 41 #8, pp. 1191–1195, Aug. 1970.
Byrd-Temp. Stabilization Of a Photoreceiver With An Avalanche Photodiode Translated From Pribory Tekitnika Eksperimenta, #4, pp. 176–178, Jul.–Aug. 1975, pp. 1224–1226.
Blackburn-A 120 mHz Bandwidth Linear Signal Trans. System Using Fiber Optics IEEE Trans on Instru. & Measure, vol. 1M24, #3, Sep. 1975, pp. 230–232.
Ozeki et al.-Half Duplex Optical Transmission Link Using an LED Source-Detector Scheme-Optics Letters-Apr. 1978, vol. 2, #4, pp. 103–105.

*Primary Examiner*—Joseph A. Orsino, Jr.
*Attorney, Agent, or Firm*—Sylvan Sherman

[57] ABSTRACT

In a digital communication system using a switching device as a detector-discriminator, information about the amplitude of the input signal is lost. As a result, there is no way to adjust the threshold of the switch as a function of signal strength to achieve minimum error rate. This problem is resolved by transmitting, along with the data, reference pulses whose amplitude is intermediate that of the data "0" and "1". Automatic threshold level control in such a system is provided by means of a coincidence circuit (13), which gates out any of the reference pulses that are detected by the detector-discriminator switch (11), and an integrating circuit (14) which averages the detected pulses over a period of time. The output from the integrator is used to bias the switch in a manner to optimize the threshold level.

2 Claims, 3 Drawing Figures

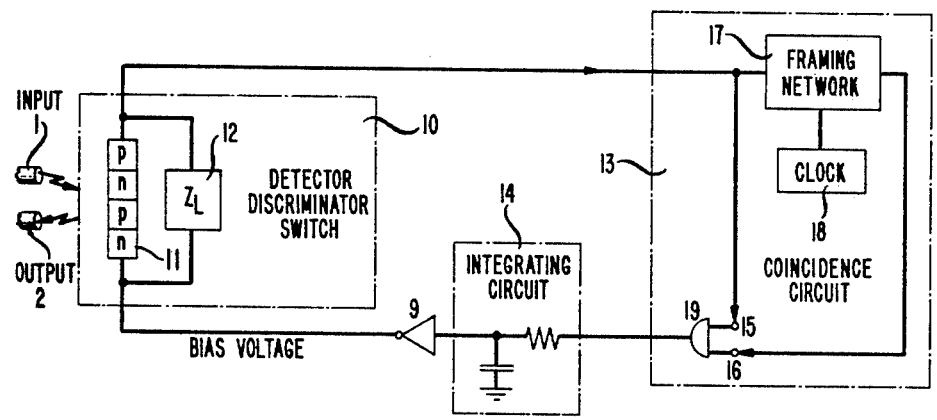
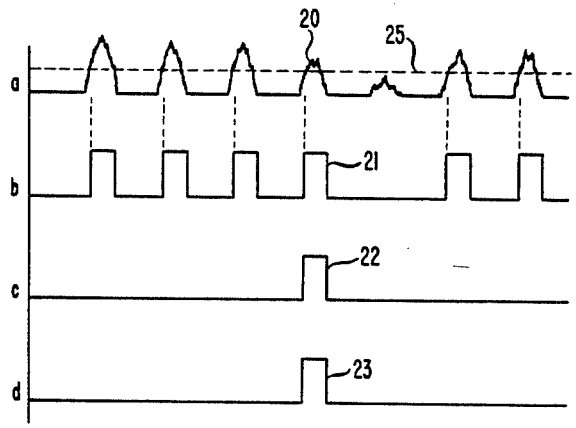
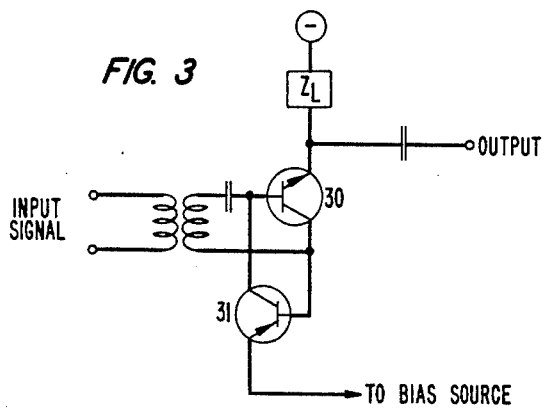

DISCRIMINATOR THRESHOLD LEVEL CONTROL CIRCUIT FOR A DIGITAL TRANSMISSION SYSTEM

TECHNICAL FIELD

This invention relates to a circuit for controlling the threshold level of switch-type detector-discriminators in digital communication systems.

BACKGROUND ART

In an article by J. E. Goell entitled "An Optical Repeater With High-Impedance Input Amplifier," published in the April 1974 issue of the *Bell System Technical Journal*, pp. 629-643, the block diagram of a repeater for use in a digital optical communication system is described. Typically, such a repeater includes a linear optical detector followed by suitable amplifiers, equalizers and filters, and a regenerator which includes a level discriminator for distinguishing between the two binary states of the signal. The regenerated pulses are then amplified, and the amplified pulses used to modulate a suitable light source.

More recently, Copeland et al, in an article entitled "Optically-Switched PNPN Light-Emitting Diodes" published in the 1977 *IEEE International Electron Device Conference Technical Digest*, pp. 580-581A, disclosed the use of a light activated pnpn light emitting diode (LA-LED) as a combination detector-discriminator. Devices of this type have been made which exhibit an S-type electrical negative resistance characteristic similar to a silicon Shockley diode. Thus, by using a suitable load impedance and bias voltage, these diodes can be made to have two stable states: (a) a high voltage, low current state, with little light output, and (b) a low voltage, high current state, with appreciable light output. It has been further shown that when the diode is in state "a", the incidence upon the diode of a relatively small optical signal will cause the diode to switch to state "b". In particular, for the illustrative diode described, a 3 microwatt incident light signal produced a 100 microwatt optical output signal along with a 1.4 volt electrical signal. The diode is reset to state "a" after a prescribed period of time by means of a passive RLC circuit which reduces the bias voltage across the diode.

The advantage of such a device resides in its simplicity. One application would be as the sole element in a tap and repeater circuit in an optical data bus. In this application optical input signal strengths would be of the order of 10 $\mu$W. Outputs of 50 to 100 $\mu$W would be adequate, since the optical fiber lengths in such an application would be relatively short. In addition to regenerating the optical signal, the electrical output would be adequate for driving TTL logic directly.

The pnpn detector-discriminator would also appear to be an attractive alternative to the optical repeater described by Goell. However, before such a device could be used in a long distance communication system, much greater sensitivity is required. This, in turn, depends upon how close the bias voltage can be set to achieve the optimum switching threshold as a function of signal strength. The difficulty, however, resides in the fact that with a switching detector it is not possible to obtain directly a measure of the input signal strength and, thereby, to develop a bias control signal for varying the threshold level as a function of the input signal strength.

It is, accordingly, the broad object of the present invention, to provide means for automatically controlling the threshold level of an optical detector-discriminator switch as a function of input signal intensity.

SUMMARY OF THE INVENTION

To optimize a switching detector-discriminator for maximum sensitivity, a reference pulse is transmitted each frame along with the data and other control pulses. The amplitude of the reference pulse is intermediate that of the data "0" and "1" pulses. The detector-discriminator circuit is characterized by a coincidence circuit which determines whether the reference pulse was detected as a "0" or "1". When averaged over a period of time, the output from the coincidence circuit produces a feedback signal to control the threshold level of the diode. When the threshold level is too low, more reference pulses are detected as a "1", causing the feedback signal to increase, thereby raising the threshold level. When the threshold level is too high, more reference pulses are detected as a "0", causing the feedback signal to decrease. When the threshold level is properly set, the reference pulses are randomly detected as either a "0" or "1".

It is an advantage of the invention that it optimizes the sensitivity of a detector-discriminator switch, making it possible to greatly simplify the circuitry of a digital repeater.

BRIEF DESCRIPTION OF THE DRAWINGS

FIG. 1 shows a detector-discriminator circuit in accordance with the present invention;

FIG. 2 shows illustrative waveform at different points in said circuit; and

FIG. 3 shows a detector-discriminator comprising a pair of transistors.

DETAILED DESCRIPTION

Referring to the drawings, FIG. 1 shows a detector-discriminator circuit comprising a detector-discriminator switch 10, and an automatic level control circuit including a coincidence circuit 13, and an integrating circuit 14, and an inverting amplifier 9. For purposes of illustration, an optical detector is shown wherein switch 10 includes a light activated pnpn diode 11 and an external load impedance 12 connected across the diode. The coincidence circuit is shown to include a framing network 17 and its associate clock 18, and an AND gate 19. The integrating circuit (14) can be a low-pass R-C filter.

In operation, a digital optical signal, coupled out of an optical fiber 1, is incident upon diode 11. If the intensity of the incident light exceeds the optical threshold level for the diode, as established by the applied bias voltage, the diode will switch, producing an amplified output light signal which is picked up by optical fiber 2, and an electrical signal which is simultaneously coupled to the framing circuit 17 and to one input port 15 of gate 19.

As indicated hereinabove, the level control circuit is designed to operate with a binary encoded signal format which includes a reference pulse whose amplitude lies between the amplitudes of the "0" and "1" data and control bits. For purposes of illustration and explanation, curve a of FIG. 2, shows a portion of an optical signal including a reduced amplitude reference pulse 20. With the optical threshold level indicated by the dashed line 25, the electrical signal produced will include a pulse 21, corresponding to the detected reference pulse 20, as indicated by curve b in FIG. 2. It will be noted that detected pulse 21 has the same amplitude as all the other detected pulses, notwithstanding the fact that reference pulse 20 is smaller than the other signal pulses. This illustrates how in a switch type detector, information about the amplitude of the input signal is lost.

The detected signal is coupled to port 15 of gate 19 and to framing network 17 which generates an output pulse 22 that is in time coincidence with the reference pulse. This output signal, illustrated by curve c in FIG. 2, is coupled to a second input port 16 of gate 19.

Inasmuch as the only coincidence of input signals to gate 19 occurs during the reference pulse time slot, the output from gate 19 will either comprise a pulse (as in the instant case where it was assumed that the threshold level is such that the reference pulse was detected), or a zero (as in those cases where the threshold level is greater than the reference pulse and the latter is not detected). In any case, the output signal from gate 19, given by curve d in FIG. 2, is coupled to integrating circuit 14, whose time constant is preferably much greater than the frame period. The resulting integrated signal produced is coupled to diode 11 by means of amplifier 9.

If the threshold level is too low, relative to the reference pulse, more reference pulses are detected, resulting in an increase in the feedback voltage derived from the integrating circuit and a corresponding decrease in the bias voltage applied to the diode. This, in turn, increases the optical threshold level. If, on the other hand, the threshold level is set too high, relative to the reference pulse, the presence of the latter is not detected, resulting in a decrease in the feedback voltage produced by the integrating circuit, and a corresponding lowering of the threshold level. When the optical threshold level is properly set, the reference pulses are randomly detected as either a binary zero or one, with an average value that, over many framing periods maintains the existing bias voltage.

While the invention can be practiced over a range of reference pulse magnitudes, there is, however, a preferred level of reference pulse which corresponds to the discrimination level which minimizes the total error rate. This preferred level of signal will, of course, vary from system to system depending upon the particular switch that is used and the minimum input signal for which the system is designed.

While the illustrative embodiment of FIG. 1 shows the invention employed in an optical system using a light activated pnpn diode, it will be recognized that the invention is equally applicable to an all electrical system using other types of detector-discriminators. For example, FIG. 3 shows a detector-discriminator comprising a pair of transistors 30 and 31 connected to form the equivalent of a pnpn diode. In this arrangement, an electrical signal, including a reduced height reference signal, is coupled by suitable means, between the base electrodes of the transistors. In all other respects, the operation of the invention is as described hereinabove.

I claim:

1. In a digital communication system in which there is transmitted, along with the data pulses, reference pulses whose amplitude is intermediate that of the data "0" and "1" pulses, a receiver comprising:
a detector-discriminator circuit including a switch (11) having a switching threshold level that is variable as a function of the bias applied thereto;
characterized in that said receiver further includes:
means (13) for gating out reference pulses received at said receiver and detected by said switch (11); and
means (14) for averaging said gated reference pulses over a prescribed period of time to produce a feedback signal for changing the bias applied to said switch so as to change the switching threshold in response to changes in the amplitude of said received reference pulses.

2. The circuit according to claim 1 wherein said system is an optical system and said switch is a light activated pnpn diode.

* * * * *

UNITED STATES PATENT AND TRADEMARK OFFICE
CERTIFICATE OF CORRECTION

PATENT NO. : 4,271,536

DATED : June 2, 1981

INVENTOR(S) : John A. Copeland

It is certified that error appears in the above—identified patent and that said Letters Patent is hereby corrected as shown below:

Column 4, line 41, Add claim 3 as follows:

--Claim 3. The circuit according to claim 2 including means (1) for detecting an incident optical wave onto said switch; and
means (2) for extracting an amplified optical wave from said switch.--.

On the title page "2 Claims" should read --3 Claims--.

Signed and Sealed this

Sixth Day of October 1981

[SEAL]

Attest:

GERALD J. MOSSINGHOFF

Attesting Officer     Commissioner of Patents and Trademarks